Oct. 18, 1932.  E. O. FINKENBINDER  1,883,775

AUTOMATIC TEST SCORER

Filed April 21, 1930

E. O. Finkenbinder
INVENTOR

BY Victor J. Evans
ATTORNEY

Patented Oct. 18, 1932

1,883,775

UNITED STATES PATENT OFFICE

ERWIN O. FINKENBINDER, OF CEDAR FALLS, IOWA

AUTOMATIC TEST-SCORER

Application filed April 21, 1930. Serial No. 446,071.

This invention relates to an automatic test scorer, ordinarily composed of pages or leaves of paper, the general object of the invention being to provide means whereby any correct, written answer, (judgment or choice) to any test item will be automatically and mechanically selected out and segregated from any incorrect answer to the same test item by being reproduced in carbon copy in an appropriately placed uncarboned space left in a carboned area, while any incorrect answer to the same test item will be reproduced in carbon copy in an appropriately placed uncarboned space formed in another part of the carboned area.

Thus the correct answers are placed in uncarboned spaces left in a certain portion of a carbon area and the incorrect answers in uncarboned spaces left in another portion of the area so that the correct answers can readily be counted and there is no danger of confusing the correct answers with the incorrect ones.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
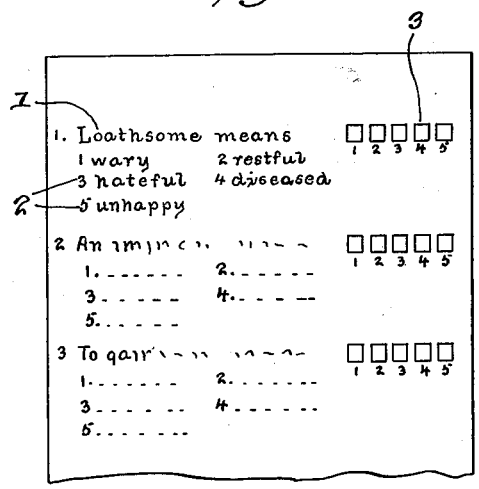
Figure 1 is a view of the invention used with sheets, one of which contains the questions and the correct and incorrect answers of the questions as well as the spaces for receiving the marks indicating the correct answers.

As shown in Figure 1, the invention is designed for use with a test page which has thereon a plurality of questions 1, with a plurality of possible answers 2 for each question. The page also has thereon a group of spaces 3 for each answer, there being as many spaces in each group as there are possible answers for the question. Thus the student or one taking the test can mark in the proper space opposite each question the answer which he thinks is the correct one, the spaces being numbered the same as the possible answers, as shown in Figure 1. For instance, if he thought the word "hateful" the proper answer for the first question, he would put a mark in No. 3 space to indicate that his selection was the No. 3 answer.

Without the aid of this invention, in order to secure the score of the person taking the tests, the correct answers must be selected from the incorrect ones and this not only takes time, but mistakes are liable to be made, due to the danger of selecting some of the wrong answers instead of the correct ones.

Figure 2:
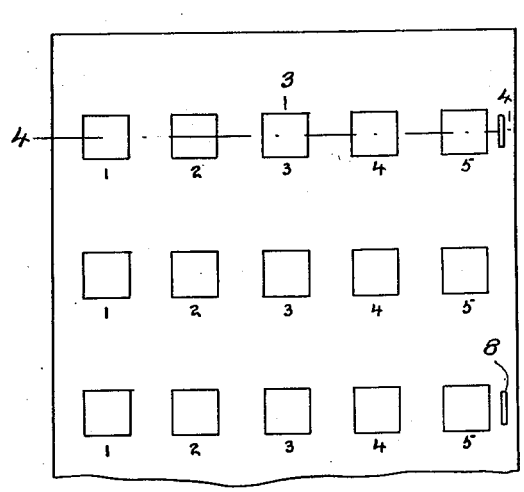
Figure 2 is an enlarged view showing the spaces for receiving the marks indicating the correct answers on a page which is separate from the test page.
Figure 3:
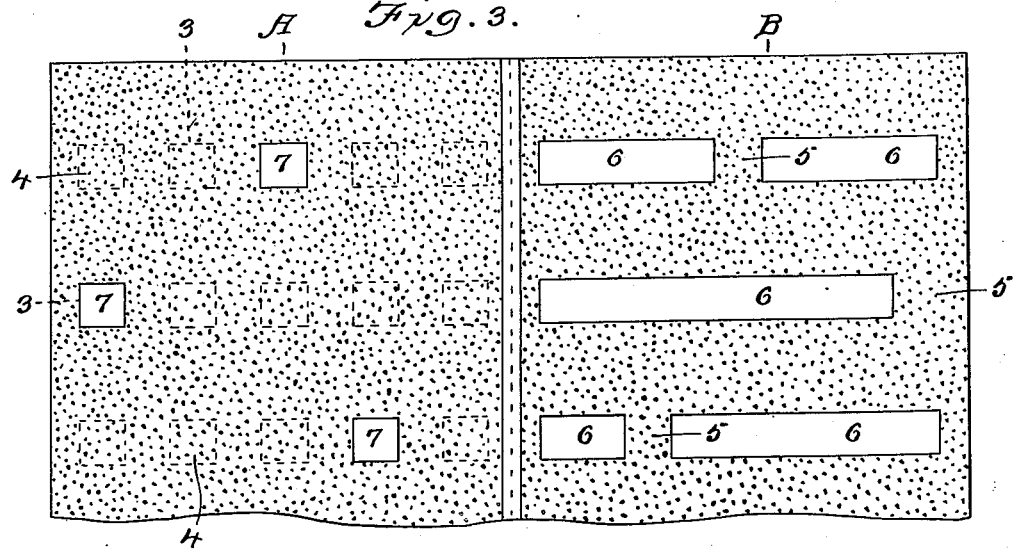
Figure 3 is a fragmentary view showing the sheet in Figure 2 unfolded and looking toward the inner faces of the pages thereof.
Figure 4:
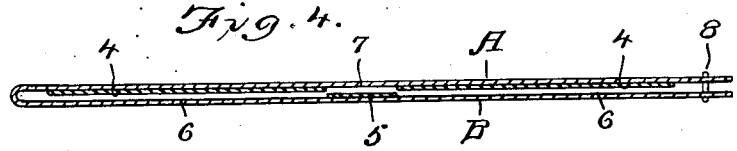
Figure 4 is a section on line 4—4 of Figure 2.

In carrying out my invention, I fold the question sheet so as to provide two pages, one under the other, or if desired, the spaces for receiving the marks indicating the correct answers may be placed on a separate sheet, as shown in Figures 2, 3 and 4, and this sheet folded to provide two leaves. Of course, the invention can be composed of two separate leaves suitably fastened together to provide superimposed pages.

In both cases, the under face of the topmost leaf A is formed with a carbon area, as shown at 4, and the top face of the under leaf B is also formed with a carbon area, as shown at 5. Spaces 6 and 7 are left uncarboned in both areas and such spaces are so arranged that when the incorrect answer to a question is marked in a space 3, a carbon copy of such mark will appear in a space 6 of the under leaf B and when a question is correctly marked in a space 3, a carbon copy of such mark will be made in a space 7 on the under face of the top leaf A. Thus the marks indicating the incorrect answers to the questions will appear on the under leaf B and the marks correctly placed will appear in the spaces of the first or top leaf A.

It will, of course, be understood that if desired, only the marks of the correctly answered questions will appear on a page, this being done by omitting the spaces in the carboned area of the other page and if desired, the parts can be so arranged that the marks of the correct answer will appear in spaces left in the carboned area of one page and the marks of the incorrectly answered questions will appear in spaces left in other portions of said carboned area so that in this latter case, the correct and incorrect answers would appear on one leaf. Thus this invention enables the score of the person taking the test to be easily and quickly secured without danger of confusing the correct answers with the incorrect ones.

The invention also makes it possible for the one taking the test, or anyone else, to see at a glance wherein he has succeeded and wherein he has failed to answer correctly. The invention also makes it possible for the recording of only the wrong answers (judgments or choices) on one leaf and the correct ones only on another leaf. Thus there is no danger of counting the incorrect answers with the correct ones.

In all previous inventions of this character, of which I am aware, one must first discriminate between a correct answer and an incorrect one, so that there is danger of incorrectly adding the correct answers, but in my invention, the correct answers are separated from the incorrect ones and any answer recorded in carbon on one page is the correct answer and thus no discrimination as to whether the answer is correct or not is left for the one who wishes to learn the score made in the test or the correctness of the answer for any item of the test.

This invention makes it possible to place a test of any desired number of items in the hands of one to be tested and to receive from the tested one his score made in the test within approximately one minute after the test (or testing time) is completed. By the use of no other testing device yet known to me is this possible, either because the one taking the test cannot do the scoring in so short a time, as is the case with this invention, or because the one tested could not, by such other testing device, be entrusted to do the scoring for reasons of inaccuracy unintentionally or intentionally, which latter inaccuracy, except by this invention, is not later discoverable, while here it is recorded and can be discovered.

The leaf when folded can be joined together when it is desired to prevent the person taking the test from having access to the carbon copies of his answers or adjacent leaves can be stapled together, as shown at 8 in the drawing. Of course, any number of the pairs of pages or leaves can be arranged together in a pad or book.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device for marking tests automatically, comprising superposed pages, the uppermost page having defined areas for receiving answers to questions, one or more carbon areas on the under face of said uppermost page of less size than the page and one or more carbon areas on the top face of the next page of less size than said page with appropriate spaces left uncarboned in the respective areas, the uncarboned spaces and the carbon areas being adapted for registering relation to each other when the pages are superposed one upon the other, whereby only those markings indicative of correct answers will be manifolded and at the same time segregated upon the one page while incorrect markings will be manifolded segregated on another page.

In testimony whereof I affix my signature.

ERWIN O. FINKENBINDER.